Sept. 10, 1940.   C. PATTERSON ET AL   2,214,537

LAWN MOWER

Filed July 27, 1939

INVENTORS
Coleman Patterson and
Elmer Patterson
By Ralph Burch
Attorney

Patented Sept. 10, 1940

2,214,537

UNITED STATES PATENT OFFICE 2,214,537

LAWN MOWER

Coleman Patterson and Elmer Patterson, Sunny Bank, Quebec, Canada

Application July 27, 1939, Serial No. 286,885

2 Claims. (Cl. 56—252)

This invention relates to improvements in a lawn mower. Its primary object being to provide a grass cutting machine for cutting close to the edges of flower beds, walks and other places inaccessible to the standard machine.

A further object of the invention is to devise a machine for the purpose set forth whereby grass may be cut close to a wall or building or trees and the like.

A still further object of the invention is to design a grass cutting machine for the purpose set forth having rotary cutting blades extending laterally from the carriage which comprises combination carriage and drive wheels and the necessary gear drive mechanism for the said rotary cutters.

With these and other objects in view that may appear while the description proceeds the invention consists in the novel construction and arrangement of parts as hereinafter more specifically set forth, claimed and shown in the accompanying drawing forming part of this application and in which:

Figure 1:
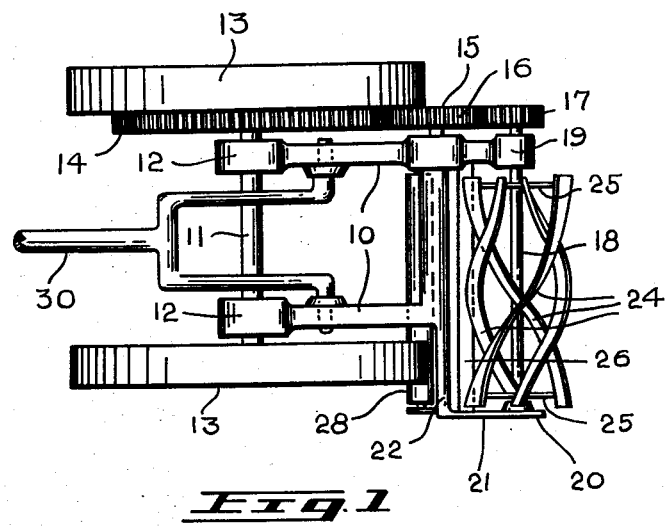
Fig. 1 is a plan view of our improved lawn mower.
Figure 2:
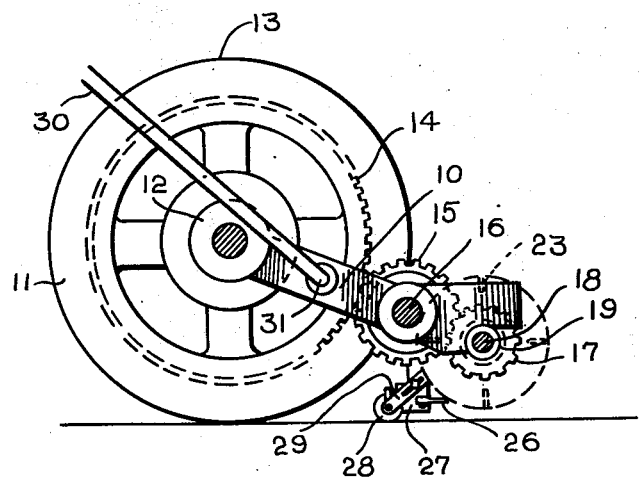
Fig. 2 is a side elevation of the same.

Referring more in detail to the drawing in which similar reference characters designate corresponding parts throughout the several views it will be seen the invention comprises a frame 10 mounted on a shaft 11 which is rotatable in journals 12 formed in the said frame. Fixed on each end of the shaft 12 are drive wheels 13 by means of which the cutting mechanism is operated. The main drive gear 14 is attached to one of the said drive wheels or may be formed integral therewith. An intermediate gear 15 is rotatably mounted on a shaft 16 fixed in the frame 10 and engages a pinion 17 which forms the drive means for the cutting element. This pinion is of the ratchet type common to this class of machinery. Said pinion is mounted on a shaft 18 which is rotatable in journals 19 and 20 constructed in the frame 10. The journal 20 is formed in the angular forward projection 21 of a lateral extension 22 of the frame 10 thus providing journals at each end of the shaft to insure a rigid support. The shaft 18, supports the rotary cutting element 23 which comprises a plurality of spiral baldes 24 attached to hubs 25 which are in turn secured to the said shaft in a manner to form a rigid structure.

A roller 28 is adjustably connected to the cutting bar 26 by means of the slide rod 29 for the purpose of raising and lowering the said cutting bar to the desired height. The whole is attached to the frame by the member 27 of the cutting bar.

A handle 30 is attached to the frame 10 by forked end members 31 positioned in the frame in a manner to bear on the shaft of the frame when the handle is depressed.

From the foregoing it will be seen that we have devised a lawn mower for the purpose set forth that will be efficient in operation and inexpensive to construct and that will leave a much smoother lawn than the old type as the wheels do not pass over the uncut grass pressing it down and leaving ridges when it straightens up again which is the case with the common type of lawn mower now in use.

It is believed that the construction and advantages of the structure shown may be apparent from the foregoing paragraphs taken in conjunction with the accompanying drawing without further detailed description.

While the preferred embodiment of the invention has been disclosed it is understood that minor changes in the details of construction, combination and arrangement of co-operating parts may be resorted to within the scope of what is claimed without departing from the spirit of the invention.

We claim:

1. A lawn mower of the type described comprising a frame composed of spaced parallel bars having journals at one end, a shaft rotatable in the journals of said bars, drive wheels mounted on the ends of said shaft, a cross bar extending between said parallel bars at a point beyond the periphery of said drive wheels, said cross bar extending laterally from one of said parallel bars beyond one of said drive wheels and bent at right angles to provide a forwardly extending projection parallel to the end of the other parallel bar, a rotary cutter reel journaled in the end of said projection and the parallel bar, a gear mounted on the end of the shaft of said cutter reel adjacent said parallel bar, a pinion gear mounted on said parallel bar in mesh with said gear and a drive gear mounted on one of said drive wheels in mesh with said pinion gear.

2. A lawn mower of the type described comprising a frame composed of spaced parallel bars having journals at one end, said bars being of unequal length, the shorter bar having a cross bar extending between its end and the other bar, said cross bar extending laterally from the shorter bar and bent at right angles to provide a projection parallel to the end of the longer bar, a cutting reel rotatably mounted between the end of the projection and end of the longer bar, a shaft rotatable in the journals of said bars, drive wheels mounted on the ends of said shaft, gearing connecting one of said drive wheels with said cutter reel, and a handle having a forked end disposed between and pivotally connected to said parallel bars intermediate their ends, said handle extending rearwardly across the top of said shaft on which it is adapted to fulcrum when moved downwardly to elevate said frame.

COLEMAN PATTERSON.
ELMER PATTERSON.